United States Patent [19]
Yang et al.

[11] Patent Number: 5,279,376
[45] Date of Patent: Jan. 18, 1994

[54] FORCE NEUTRALIZING MECHANISM FOR A SINGLE LEVER CONTROL

[75] Inventors: Xinzhan Yang, Corydon; Douglas McFarland, Lamoni; Steven D. Shivvers, Allerton; Donald H. Parkes, Lamoni, all of Iowa

[73] Assignee: Shivvers, Incorporated, Corydon, Iowa

[21] Appl. No.: 874,024

[22] Filed: Apr. 27, 1992

Related U.S. Application Data

[63] Continuation-in-part of Ser. No. 647,455, Jan. 28, 1991, Pat. No. 5,131,483.

[51] Int. Cl.$^5$ .................. B62D 11/04; B60K 26/00
[52] U.S. Cl. .................. 180/6.48; 180/271; 180/333; 74/471 XY
[58] Field of Search .......... 180/6.34, 6.48, 6.66, 180/333, 336, 271, 272, 286; 74/471, 473

[56] References Cited

U.S. PATENT DOCUMENTS

| | | | |
|---|---|---|---|
| 2,941,609 | 6/1960 | Bowers et al. | 180/6.48 |
| 3,306,385 | 2/1967 | Kempson | 180/6.48 |
| 3,323,607 | 6/1967 | Futamata | 180/6.48 |
| 3,528,519 | 9/1970 | Case | 180/6.48 |
| 3,540,220 | 11/1970 | Lauck | 180/6.48 X |
| 3,541,877 | 11/1970 | Houk | 180/6.48 X |
| 3,613,817 | 10/1971 | Glass | 180/6.48 |
| 3,620,096 | 11/1971 | Scolari | 180/6.48 X |
| 3,857,298 | 12/1974 | Case et al. | 180/6.48 |
| 3,891,042 | 6/1975 | Braun | 180/6.48 |
| 4,085,812 | 4/1978 | Robinson et al. | 180/6.48 |
| 4,152,950 | 5/1979 | Langford | 74/471 XY X |
| 4,213,484 | 7/1980 | Habiger | 74/471 XY X |
| 4,267,804 | 5/1981 | Rypka | 180/271 |
| 4,321,980 | 3/1982 | Nissen | 180/6.48 |
| 4,371,051 | 2/1983 | Achterhold | 180/271 |
| 4,572,019 | 2/1986 | Suzuki | 74/471 XY |
| 4,704,915 | 11/1987 | Friesen et al. | 180/333 |
| 4,736,647 | 4/1988 | Shimoie et al. | 180/333 X |
| 4,799,398 | 1/1989 | Asano | 180/19.1 X |
| 4,809,796 | 3/1989 | Yamaoka et al. | 180/6.48 |
| 4,823,895 | 4/1989 | Kimball | 180/6.48 |

OTHER PUBLICATIONS

Advertising Literature from Schweiss entitled "Schweiss Magnum Lawn Mowers".
Advertising Literature from Quadrastat Corporation

*Primary Examiner*—Margaret A. Focarino
*Assistant Examiner*—Kevin Hurley
*Attorney, Agent, or Firm*—Wallenstein, Wagner & Hattis, Ltd.

[57] ABSTRACT

This invention provides a force neutralizing mechanism 500 coupled to a single lever control 10 and a transmission controlled by the lever 10 for overcoming the transmission linkage forces $F_2$ associated with controls of a pair of mechanical transmissions 532 so that the mechanical transmissions 532 may be comfortably controlled by the single lever control 10.

32 Claims, 9 Drawing Sheets

FORCE NEUTRALIZING MECHANISM FOR A SINGLE LEVER CONTROL

This application is a continuation-in-part of the co-pending application Ser. No. 07/647,455 issued Jan. 28, 1991, which has issued as U.S. Pat. No. 5,131,483.

TECHNICAL FIELD

The present invention generally relates to a control apparatus and specifically to a single lever control that may be used to control, among other things, a zero turning radius vehicle.

BACKGROUND OF THE INVENTION

A single lever control may be used to control a variety of mechanisms. For example, a single lever control may be connected to a set of cables or a set of connected rods and used to control independent hydrostatic or mechanical transmissions which drive wheels on opposite sides of a zero turning radius vehicle. The speed and direction of a zero turning radius vehicle may therefore be controlled by varying the speed of each wheel. By driving one wheel faster than the other it will cause the vehicle to turn about the wheel that is moving more slowly.

A zero turning radius vehicle may be used for a variety of purposes. For example, a zero turning radius vehicle may be fitted with grass cutting equipment and used as a riding lawn mower. The maneuverability of the zero turning radius vehicle allows an operator to cut around objects, such as trees, with ease.

Prior attempts at providing a lever control system for a zero turning radius vehicle has required mounting a right and left control lever on either side of an operator's seat. The right control lever would control the speed of the right wheel and, conversely, the left control lever would control the speed of the left wheel. The operator of a zero turing radius vehicle would operate one lever by each hand thereby requiring the operator to coordinate the movement of each hand to turn the vehicle or to make the vehicle drive in reverse. However, this dual lever control system may sometimes be difficult to operate for the beginning or unskilled operator.

Therefore, it is desirable to provide a single lever control which allows the operator to control the vehicle with one hand. This eliminates the need to coordinate one hand with the other in turning and backing. This single lever control also eliminates the need for a second lever arm thereby reducing the cost of the controls.

Other companies such as Schweiss, Incorporated provide a single lever control system for a zero turning radius vehicle. However, Schweiss uses a hydraulically driven control. The hydraulic control system is inherently more complicated and expensive to install and to operate than a single lever cable or rod control. For this reason it is desirable to provide an inexpensive method of providing a single lever control for a zero turning radius vehicle.

SUMMARY OF THE INVENTION

The present invention, which may be referred to as a joystick or joystick control, may be used for controlling a pair of cables or a pair of connected rods, which ultimately controls an apparatus such as a zero turning radius vehicle.

According to the present invention, the joystick control comprises a lever having first and second portions and a lever mount disposed between the first and second lever portions to present a pivotal fulcrum. A pair of cables or set of connected rods with opposed first and second ends have each of the first cable or rod ends attached to the lever, wherein movement of the lever provides both tandem and reciprocal displacement of the cables or rods. The second end of the cables or rods are attached to a mechanism to be controlled by the joystick.

An ignition disabling switch is provided in connection with the joystick to disengage the ignition when the joystick is in a nonoperating position. The switch is activated and deactivated by movement of the joystick from an operating position to a nonoperating position, preventing starting and movement of the vehicle unless the operator is in position to control it.

According to another aspect of the present invention, a means for limiting the movement of the joystick through a desired range of motions is associated with the joystick. Preferably the joystick is disposed through a template that limits the range of movements of the joystick to a desired range of motions.

According to another aspect of the invention, a means for returning the joystick to a neutral position is also associated with the joystick. A return to neutral mechanism moves the joystick to a neutral position when the joystick is not being operated.

Finally, a means for neutralizing a transmission linkage force of a mechanical transmissions is associated with the joystick so that an operator may easily control the vehicle.

DETAILED DESCRIPTION

While this invention is susceptible of embodiment in many different forms, there is shown in the drawings and will herein be described in detail a preferred embodiment of the invention. The present disclosure is to be considered as an exemplification of the principles of the invention and is not intended to limit the broad aspect of the invention to the embodiment illustrated.

Figure 5:
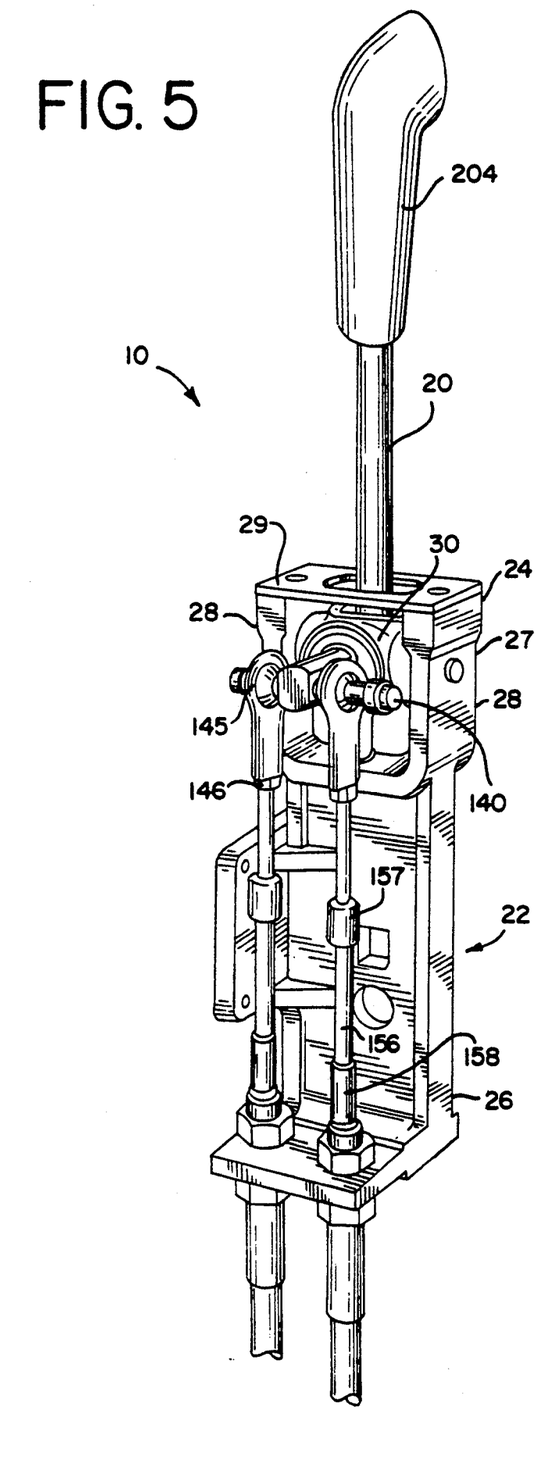
FIG. 5 is a perspective view of the present invention.

FIG. 5 shows a single lever control or a joystick control 10 having a joystick 20 mounted in a frame 22. The frame 22 has first and second ends 24, 26. The first end 24 of the frame 22 has a yoke 27 having a pair of tines 28 in spaced relation that terminate at an endplate 29. A lever mount or pivot block 30 is pivotally mounted within the frame 22. The lever mount 30 presents a pivotal fulcrum for the joystick 20 allowing the joystick to move through a range of motions.

Figures 1, 2:
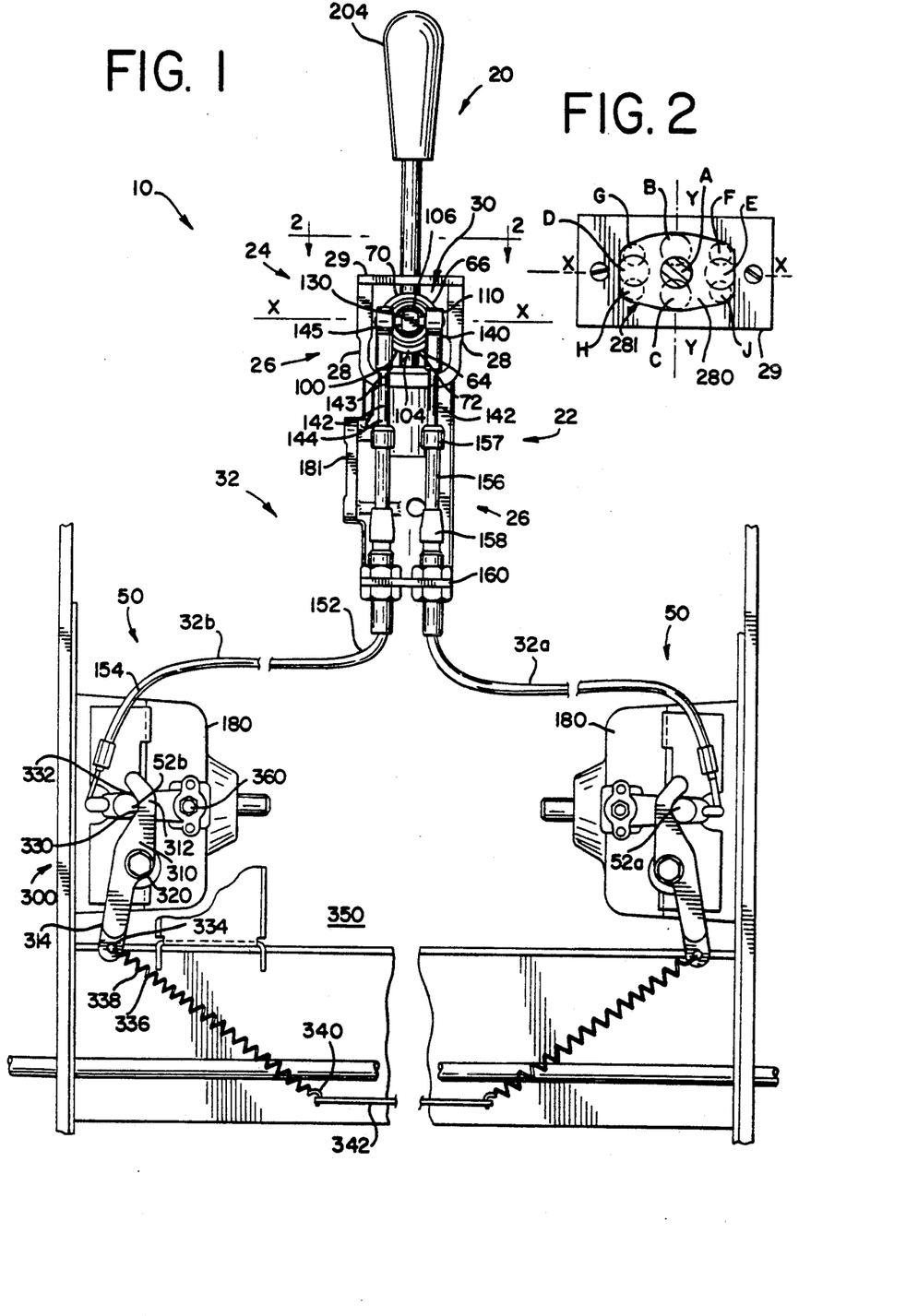
FIG. 1 is a schematic representation of the present invention using cables to control two independent hydrostatic transmissions.
FIG. 2 is an end view taken along line 2—2 of FIG. 1.
Figure 6:
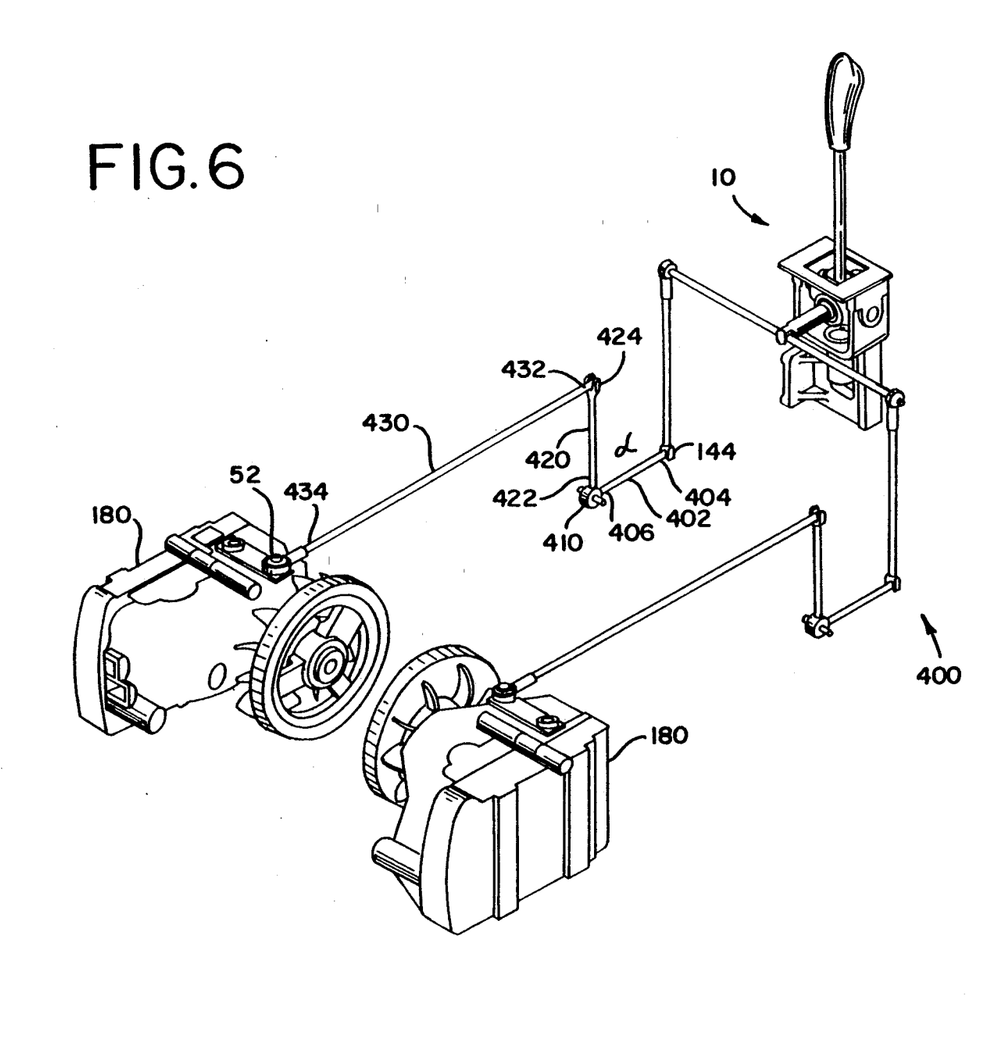
FIG. 6 is a perspective view of the present invention using a set of connected rods to control independent hydrostatic transmissions.

As described in greater detail below and as seen in FIG. 1, a pair of cables 32 are responsive to movement of the joystick 20 causing both tandem and reciprocal movement of the cables 32. Also discussed below and as shown in FIG. 6, a set of connected rods 400 may be used instead of the cables 32. The cables 32 link the joystick 20 to a mechanism 50 that has lever controls 52. The lever controls 52 are responsive to movement of the cables 32 so that the mechanism 50 may be controlled by movement of the joystick 20.

Figure 1A:
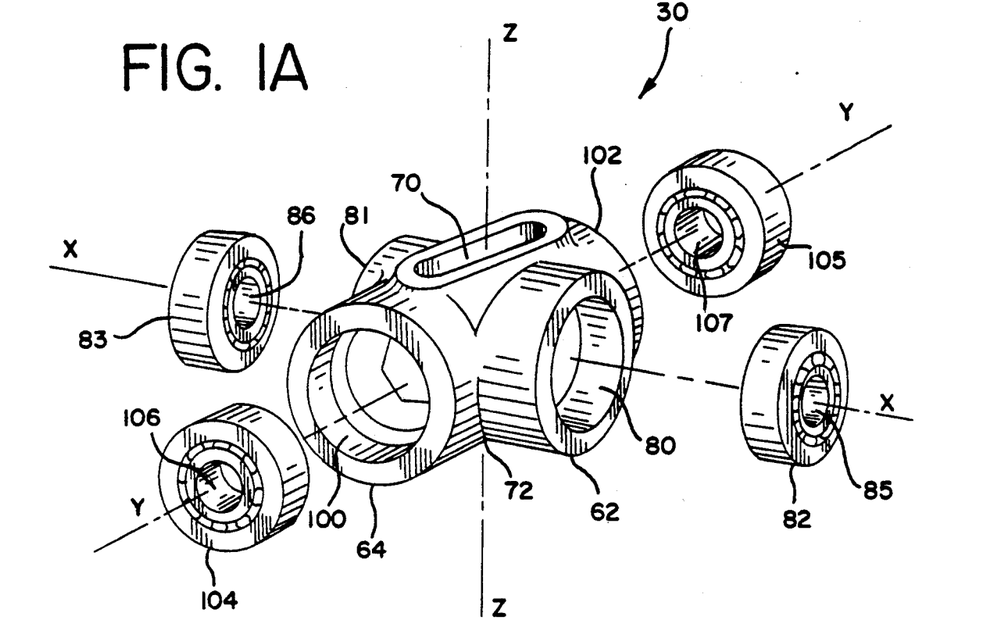
FIG. 1A is an exploded view of the lever mount of the present invention.

More specifically, the lever mount 30 has first and second cylinders 62 and 64 integral with one another. The first cylinder 62 has a first axis along line X—X of FIG. 1. The second cylinder 64 has a second axis along line Y—Y of FIG. 1 that is substantially perpendicular to the first axis as seen in FIG. 1A. The lever mount 30 has an oval-shaped top and bottom opening 70 and 72 in alignment and adapted to receive the joystick 20 and to accommodate movement of the joystick 20 along line Y—Y. The joystick 20 is also movable along line Z—Z from a downward position to an upward position. (See FIGS. 3 and 4).

Each end of the first cylinder 62 has bearing races 80 and 81 and a set of sealed bearings 82 and 83 disposed respectively in the bearing races 80, 81. A set of bronzed bearings or other bearing types would also be appropriate.

Each set of bearings 82 and 83 have a central opening 85 and 86. The lever mount 30 is mounted between the tines 28 of the yoke 27 by inserting a pair of trunion pins 87 through holes 90 and 92 provided in the opposed tines 28 and through the central openings 85, and 86 in the bearings 82 and 83. The lever mount 30 is therefore rotatable within the tines 28 of the yoke 27 about the line X—X.

The second cylinder 62 similarly has races 100, 102 at opposed ends and a set of sealed bearings 104, 105 having central openings 106 and 107 in alignment. The bearings 104 and 105 are disposed respectively within races 100, 102. A shaft 110 is inserted through the central openings 106 and 107 and rotates about line Y—Y of FIG. 1. The shaft 110 has first and second opposed ends 112, 114. (See FIG. 1B). Shaft 110 has a first bore 120 at an intermediate portion that is in alignment with the top and bottom oval-shaped openings 70, 72 of the lever mount 30. The bore 120 is dimensioned to receive the joystick 20.

Figure 1B:
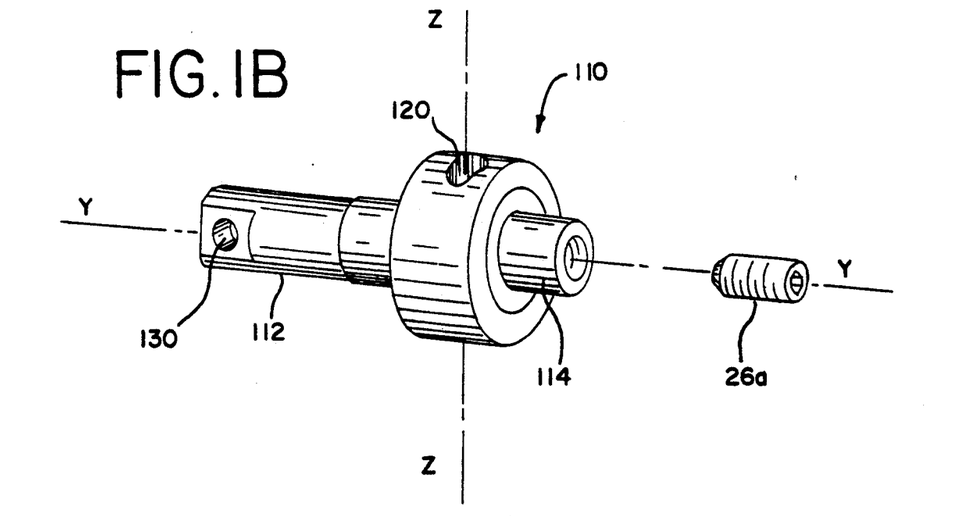
FIG. 1B is an exploded view of a shaft in the present invention.

The shaft 110 has a second bore 130 proximate the first shaft end 112. A cross bar 140 is fixedly inserted through the second shaft bore 130 such that the cross bar 140 is substantially perpendicular to line Y—Y and substantially parallel to line X—X. Control rods 142 each have first 143 and second ends 144. The first end 143 of each control rod 142 has ball joints 145 that rotatably mount on the cross bar 140 at opposite sides of the second shaft end 114. Preferably each ball joint 145 is located equidistant from the first shaft end 112. The distance the ball joint is from the first shaft end 112 versus the distance the second bore 130 determines the sensitivity of the lateral movement of the zero turning radius vehicle.

Cable length adjustment nuts 146 are provided adjacent the ball joints 145 for fine adjustment of the cable 32 length.

The cables 32, each having first and second ends 152 and 154, have each of their first cable end 152 attached to each of the second control rod ends 144. The endmost portion of the second control rod ends 144 (not shown) are crimped about the first cable end 152 thereby coupling the control rods 142 to the cables 32.

Sleeves 156 and dust covers 157 and 158 are provided to cover the second control rods ends 144 and the first cable ends 152 proximate where the control rods 142 couple to the cables 32 to prevent the accumulation of foreign materials. The sleeves 156 are adapted to accommodate movement of the control rods 142. The sleeves 156 are fixedly attached to the bulkhead 160 of frame 22 with attachment nut 161. Attachment nut 161 also provides cable length adjustment.

Each of the second cable ends 154 is attached to controls 52 of the mechanism 50 that is to be controlled by the joystick 20.

For example, mechanism 50 comprises two hydrostatic transmissions 180 with independent controls 52a and 52b. The two hydrostatic transmissions 180 driven by a power plant 232, for example, may be used to drive a right and left drive wheel of a zero turning radius vehicle 233a and 233b. The frame 22 is mounted on the zero turning radius vehicle using attachment member 181 proximate an operating compartment of the vehicle (not shown). The speed and direction of the zero turning radius vehicle may be controlled by individually controlling the speed of drive wheels 233a and 233b on opposite sides of the vehicle using the joystick 20. By driving one wheel faster than the opposite wheel, the vehicle turns or pivots about the slower wheel. Preferably the zero turning radius vehicle moves in a direction and speed corresponding to the direction in which an operator moves the joystick 20.

Figure 3:
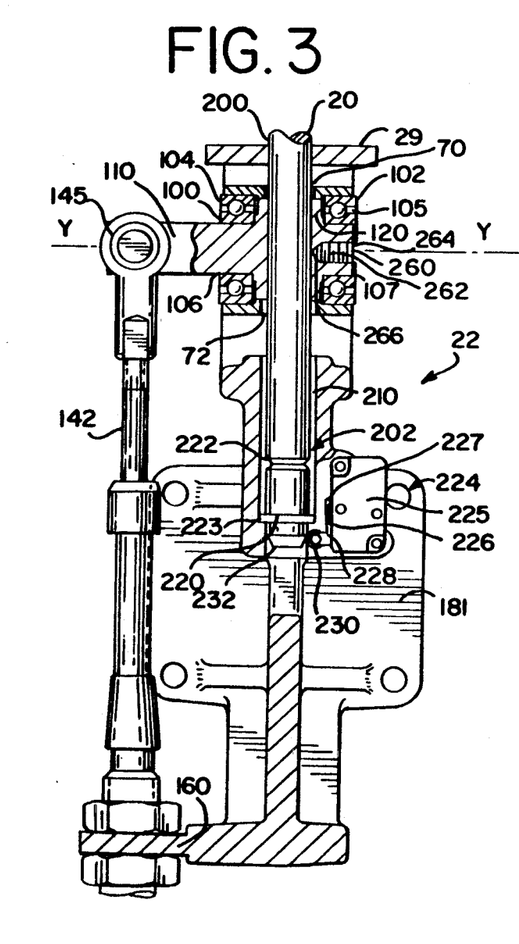
FIG. 3 is a right side view of the present invention in partial cross section.
Figure 4:
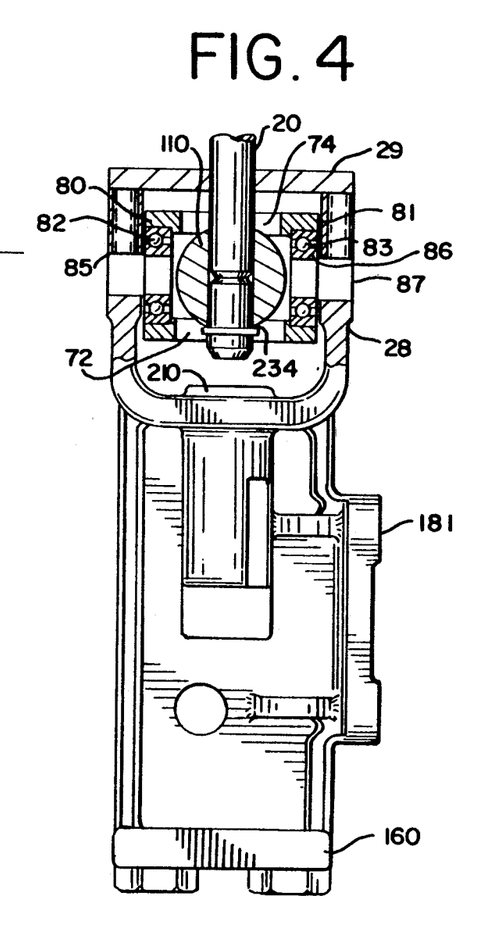
FIG. 4 is a back view of the present invention and partial cross section.

FIG. 3 shows joystick 20 in a downward position. The joystick 20 has a first end 200 and a second end 202. The first end 200 of the joystick 20 has an operator's handle 204. (See FIG. 1). When joystick 20 is in the downward position, the second joystick end 202 is inserted into a channel 210 at an intermediate portion of the frame 22. The channel 210 is in alignment with the top and bottom oval-shaped openings 70, 72 of the lever mount 30 and the bore 120 of the shaft 110. When the joystick 20 is in the downward position, the channel 210 presents a close fit thereby preventing the joystick 20 from pivoting. Therefore, the downward position is the nonoperating position.

The second joystick end 202 has a snap ring 220 and a circumferential detent 222 in vertical spaced relation. The snap ring 220 abuts a shoulder 223 in the channel 210 thereby defining the lowest position of the joystick 20.

An electric switch 224, preferably a miniature limit switch, is attached to an intermediate portion of the frame 22. The miniature limit switch 224 has a body 225 with an arm 226 having first and second ends 227, 228. The first arm end 227 is hingedly attached to the miniature limit switch body 225. An intermediate portion of the arm 226 engages a switch (not shown). The second arm end 228 terminates in a roller 230. The roller 230 operatively engages a tapered portion 232 of the second joystick end 202 thereby deflecting the arm 226 toward the miniature limit switch body 225 thereby engaging the switch. When the joystick 20 is moved to an upward, operating position, the arm 226 deflects back against the frame 22 and deactivates the switch.

Figure 7:
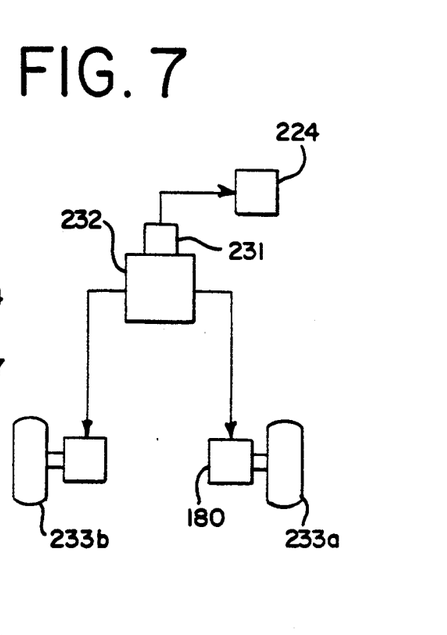
FIG. 7 is a schematic representation of the power drive system of the zero turning radius vehicle.

FIG. 7 shows the miniature limit switch 224 is wired in series to an ignition system 231 of a motor power source or power plant 232 such as a gas engine, electric motor or the like, that supplies motive power to the hydrostatic transmission 180 so that the hydrostatic transmission 180 may not be started unless the joystick 20 is in the downward position. Therefore, the zero turning radius vehicle may not be started when the joystick 20 is in the operating position, thereby preventing the zero vehicle from lurching when starting the vehicle.

The upward most position of joystick 20 (See FIG. 4) is obtained when the joystick is moved upward along line Z—Z until the snap ring 220 abuts a lower portion 234 of the shaft 110. A spring loaded ball plunger 260 (See FIG. 3) with external threads 262 is threaded into the a set of internal threads 264 provided in the second shaft end 114. The spring loaded ball plunger 260 has a ball bearing 266 and a spring (not shown). When the ball plunger 260 is threaded into the second shaft end 114, the ball bearing 266 extends into the first bore 120 of the shaft 110 and engages the joystick 20. The joystick 20 is held in the upward position when the ball bearing 266 snappingly engages the circumferential detent 222.

To move the joystick 20 back into the downward, nonoperating position, the joystick 20 is centered and pushed downward along line Z—Z to snappingly disengage the ball bearing 266 from the circumferential detent 222. The second joystick end 202 is guided into channel 210 to lock the joystick 20 from pivotal movement.

FIG. 2 shows joystick 20 being disposed through an opening 280 in endplate 29. The opening 280 is in alignment with the top opening 70 of the lever mount 30. The endplate opening 280 is designed to form a template 281 to guide the joystick 20 through a desired range of motions, controlling the zero turning radius vehicle through a range of desired speeds and directions.

For example, when joystick 20 is in position A at the intersection of lines X—X and Y—Y there is no displacement of the cables 32, thereby defining a neutral position.

To provide for tandem movement of the cables 32, i.e., movement of both cables 32 in the same direction, the joystick 20 must be moved along line Y—Y to position B or C. Movement of the joystick 20 to position B causes the lever mount 30 to pivot about line X—X thereby causing both ends of the control rods 142 to move up causing a simultaneous upward displacement of both cables 32. Movement of the joystick 20 to position C causes the lever mount 30 to pivot about line X—X thereby causing a downward displacement of both cables 32 simultaneously.

To provide reciprocal movement of the cables 32, i.e., movement of the cables 32a and 32b in opposite directions, the operator must move the joystick 20 to positions D or E. Movement of the joystick 20 to position E causes the shaft 110 to rotate about the line Y—Y in a clockwise fashion as viewed from FIG. 1. The clockwise rotation of the shaft 110 causes the left end of the cross bar 140 to move up and the right end of the cross bar 140 to move down simultaneously thereby causing a corresponding upward displacement of cable 32b and a downward displacement in the cable 32a.

Movement of the joystick 20 to position D causes a counterclockwise rotation of the shaft 110 as viewed from FIG. 1, causing the left side of the cross bar 140 to move downward and the right side of the cross bar 140 to move upward simultaneously thereby causing a corresponding reciprocal displacement in the cables 32.

Movement of the joystick 20 in directions other than along line X—X or line Y—Y will cause both tandem and reciprocal displacement of the cables 32. For example, movement of the joystick 20 to position F will cause maximum upward displacement of the cable 32b together with a downward displacement of the cable 32a.

Movement of the joystick 20 to position G will cause maximum upward displacement of cable 32a together with a downward displacement of cable 32b.

Movement of the joystick 20 to position H will cause the lever mount 30 to pivot downward, and the cross bar 140 to rotate counterclockwise along line Y—Y resulting in a maximum downward displacement of cable 32b and an upward displacement of cable 32a.

Movement of joystick 20 to position J causes the lever mount to rotate downward about line X—X and shaft 110 to rotate clockwise about line Y—Y causing a maximum downward displacement of cable 32a and a vertical displacement of cable 32b.

Preferably the joystick 20 is used to control independent hydrostatic transmission 180 on the zero turning radius vehicle (not shown). The joystick 20 should be mounted on the vehicle so that the joystick, as viewed in FIG. 1, should face the rear of the vehicle. The motor controls 52 are adapted to control the hydrostatic transmission 180 to drive the vehicle forward when the cables 32 are pulled by an upward movement of the cross bar 140, and to drive the vehicle in reverse when the cables 32 are pushed by a downward movement of the cross bar 140. The greater the distance the joystick 20 is from the neutral position A, a greater the displacement of the cables 32; therefore, the greater the speed of the vehicle.

For example, moving the joystick 20 to position B causes the maximum vertical displacement of the cables 32 driving the zero turning radius vehicle forward at a maximum speed. Moving the joystick 20 to position C causes the vehicle to move in reverse. Preferably, the template 281 is designed to limit the rearward speed to be less than the forward speed.

The vehicle may be turned while moving forward by moving the joystick 20 in the direction an operator wishes to turn. To turn right, the operator must move joystick 20 to the right to position F, driving the left wheel faster than the right wheel causing the vehicle to turn right. To turn left the operator need only move the joystick 20 to the left to position G. The difference in displacement of the cables 32a and 32b causes the right wheel to move faster than the left wheel causing the vehicle to turn to the left.

To make a turn while the vehicle is not moving forward one need only move the joystick to position E to turn right, and to position D to turn left. To make a turn in reverse while not moving in reverse, the operator need only move the joystick 20 to position H to turn right and to position J to turn left.

It is desirable when operating the vehicle with the joystick 20 that the joystick 20 be returned to the neutral position A when the joystick 20 is not being directed by the operator. This will ensure that when the operator of the zero turning radius vehicle dismounts the vehicle that the joystick 20 automatically returns to neutral. To this end, a return to neutral mechanism 300 is provided on the motor controls 52. (See FIG. 1). A cam bar 310 having first and second ends 312 and 314 are mounted to the hydrostatic transmission 180 with a mounting bolt 320 allowing pivotal movement of the cam bar 310. The first end of the cam bar 312 has a generally V-shaped notch 330 that engages a portion 332 of the motor control 52. The second cam bar end 314 has an eyelet 334. A spring 336 having first and second ends 338, 340, has its first end 338 attached to the cam bar eyelet 334 and its second spring end 340 attached to a portion 342 of frame 350 of the vehicle.

The controls 52 are adapted to move about a pivot 360 in response to movement of the cables 32 caused by movement of the joystick 20. When the operator of the vehicle does not apply pressure on the joystick 20 in any particular direction, the spring 336 provides sufficient tension upon the cam bar 310 to return the controls 52 to a neutral position, thereby moving the joystick 20 to the neutral joystick position A.

For example, if the operator is driving the vehicle forward by moving the joystick to position B causing the cables 32 to move upward thereby causing the controls 52 to pivot upward in FIG. 1, and the operator of the vehicle subsequently releases the joystick 20, the spring 336 overcomes the tension in the cables and returns both the controls 52a and 52b to a neutral position and the joystick 20 to a neutral position A.

Although we have described the present invention as having a frame 22 mounted on the zero turning radius vehicle with the joystick 20 pointed forward, it can also have any arrangement on the zero turning radius vehicle so that joystick 20 allows for a proper direction for steering.

FIG. 6 shows a second preferred embodiment of the present invention replacing the cables 32 with a series of connected rods 400. A first rod 402 having first 404 and second 406 opposed ends, has its first end 404 rotatably attached to the second control rod ends 144. The second end 406 of the first rod 402 is fixedly attached to a pivot 410. A second rod 420 having first 422 and second 424 opposed ends, has its first end 422 fixedly attached to the pivot 410 to maintain an angle $\alpha$, preferably 90 degrees, between the second rod 420 and the first rod 402. The second end 424 of the second rod 420 is attached to a third rod 430 at its first end 432. A second end 434 of the third rod 430 is attached to the controls 52 of the hydrostatic transmissions 180.

Movement of the joystick 20 in a first plane causes reciprocal or tandem movement of the control rods 142 in a second plane perpendicular to the first plane, causing the first 402 and second rods 420 to rotate about the pivot 410, causing translational motion of the third rod thereby controlling the hydrostatic transmission 180.

As stated above, the joystick 20 may also be used to control a mechanical transmission such as the one sold by Dixon, Inc., used in zero turning radius mowers. As in the case of a hydrostatic transmission, a pair of mechanical transmissions are associated with drive wheels on opposite sides of the vehicle. In the past, these mechanical transmissions were controlled by a pair of control levers each two to three feet long. These control levers provided sufficient leverage to overcome transmission linkage forces (See $F_2$ FIG. 8) associated with the controls of these transmissions. However, it may be difficult to overcome the transmission linkage forces of two mechanical transmissions using a lever 20 disclosed in FIG. 1 which is less than one foot long. Thus, it is desirable to neutralize the transmission linkage forces when using the joystick 20 to control mechanical transmissions.

Figure 8:
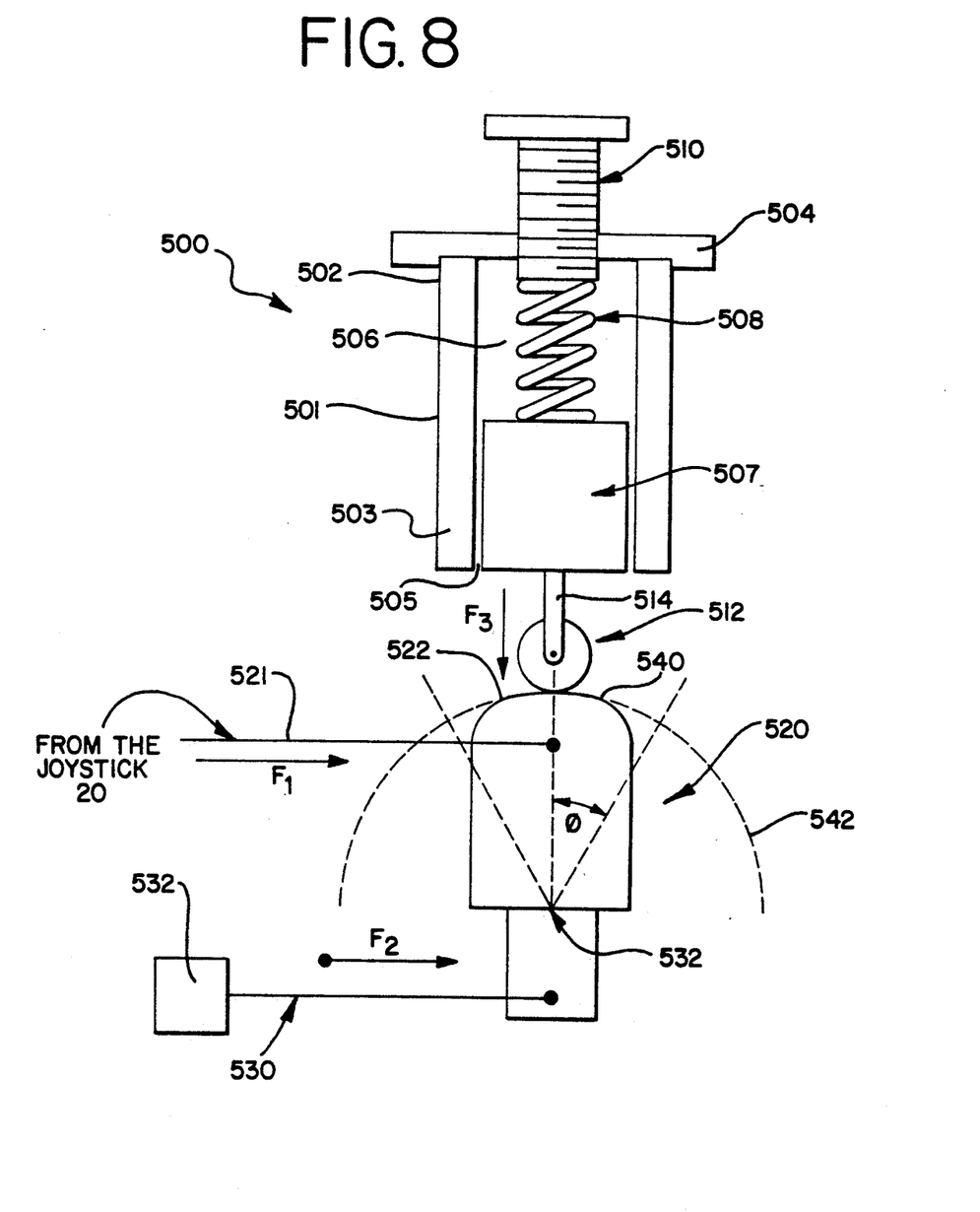
FIG. 8 is a schematic of a force neutralizing mechanism.

FIG. 8 discloses one embodiment of a force neutralizing mechanism 500 having a housing 501 having first and second ends 502 and 503. An endplate 504 closes the first end of the housing 501 and the second end of the housing 501 has an opening 505. The housing 501 defines a central channel 506 between its first and second ends 502 and 503. A plunger 507 is slidably mounted in the central channel 506 and moves in response to a force applied by a compression spring 508. The tension of the spring 508 may be adjusted with an adjusting screw 510 which is threaded through the endplate 504. A roller 512 is rotatably connected to the plunger 507 with an arm 514.

The roller 512 cooperatively engages a linkage block 520 at a head end 522 of the linkage block 520. The linkage block 520 connects a joystick control linkage 521, either the connected rods 400 or cables 32, to a transmission linkage 530 which is in turn connected to the controls of a mechanical transmission 532. Therefore two force neutralizing mechanisms 500 will be needed to control two transmissions 532. The linkage block 520 is pivotally connected to the vehicle at a pivot point 534 and pivots through angle $\phi$ in response to movement of the joystick 20.

FIG. 8 shows the linkage block 520 when the joystick 20 is in the neutral position A. As the joystick 20 is moved away from the neutral position A by the operator such that a force $F_1$ is applied to the linkage block 520, the linkage block 520 pivots clockwise about the pivot point 534 where it is attached to the vehicle. The force $F_1$ must be great enough to overcome the transmission linkage force $F_2$. Because this force may be great, the operator will be assisted in overcoming this transmission linkage force $F_2$ by the force $F_3$ imparted by the spring 508 upon the linkage block 520 through the roller 512.

It has been observed that the transmission linkage force $F_2$ increases as the angle $\phi$ increases. Therefore, it is desirable that the force $F_3$ varies in the corresponding amount as angle $\phi$ increases and decreases so that an operator can apply a comfortable force to control the vehicle irrespective of the distance the joystick 20 is displaced from the neutral position A. To accomplish this end, the head end 522 of the linkage block 520 has a curved profile 540 having a curvature 542 which causes the component of the force $F_3$ acting to overcome the force $F_2$ to increase as $\phi$ increases.

Figure 9:
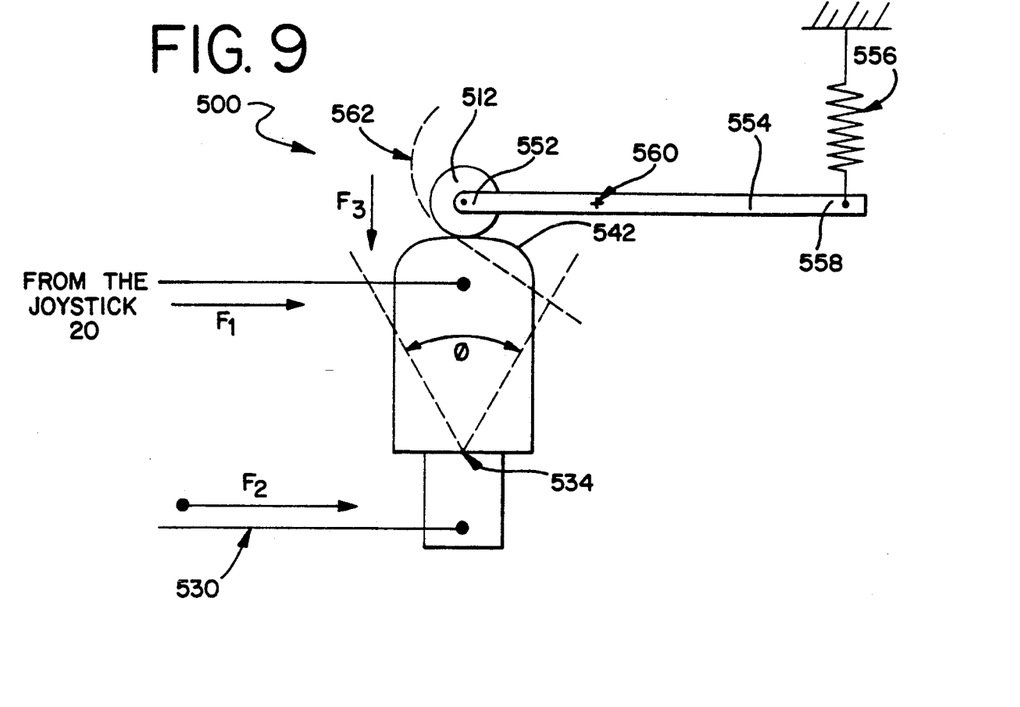
FIG. 9 is a schematic of a second embodiment of the force neutralizing mechanism.

FIG. 9 shows a second embodiment of the force neutralizing mechanism 500. In this embodiment the roller 512 is rotatably attached to a first end 552 of a pivot arm 554. The force $F_3$ is imposed upon the linkage block 520 by an extension spring 556 which is attached to a second end 558 of the pivot arm 554. The pivot arm 554 pivots about the arm pivot point 560.

Figure 10:
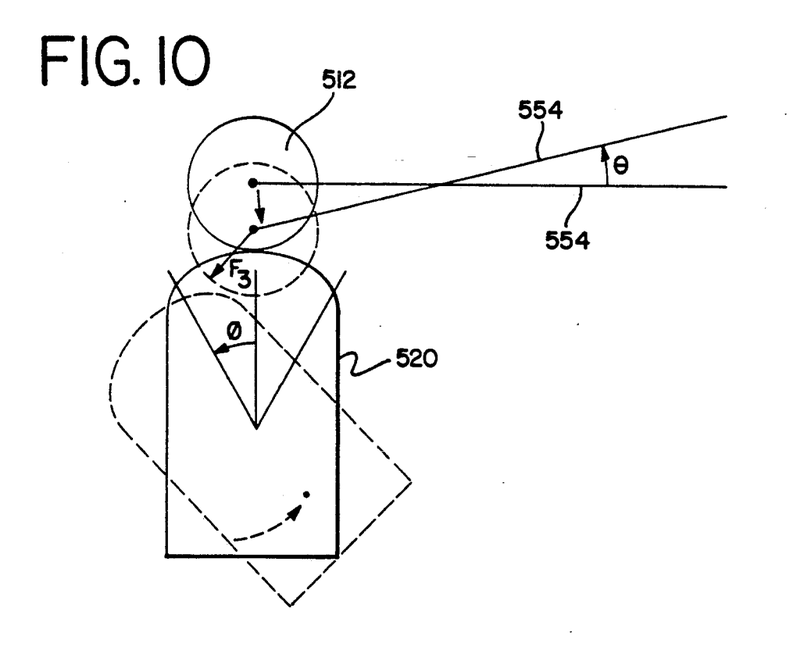
FIG. 10 is a schematic view of a linkage block, pivot arm and roller of the force neutralizing mechanism while the linkage block is pivoting.

FIG. 10 shows that as the pivot arm 554 moves about the arm pivot point 560 through an angle Θ, the linkage block 520 moves through the angle φ. Because the roller 512 moves through the arc 562 instead of in a straight-line fashion as in the first embodiment 500 (FIG. 8), the force $F_3$ acts at a perpendicular to the tangent line to the roller 512 and the linkage block 520. Accordingly, the curvature 542 of the linkage block 520 in the second embodiment may vary from that of the first.

Figure 11:
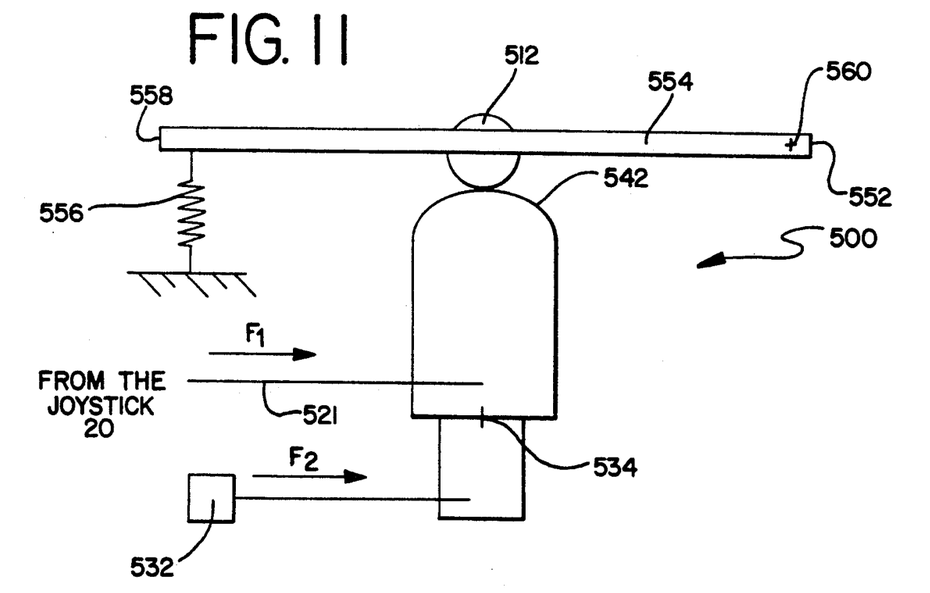
FIG. 11 is a schematic view of a third embodiment of the force neutralizing mechanism.

FIG. 11 shows a third embodiment of the force neutralizing mechanism 500. In this embodiment the pivot arm 554 is pivotally mounted at point 560 to the vehicle at the first end 552 of the pivot bar 554, the roller 512 is rotatably connected to an intermediate portion of the pivot bar 554, and the spring 556 is connected to the second end 558 of the pivot arm 554.

Figure 12:
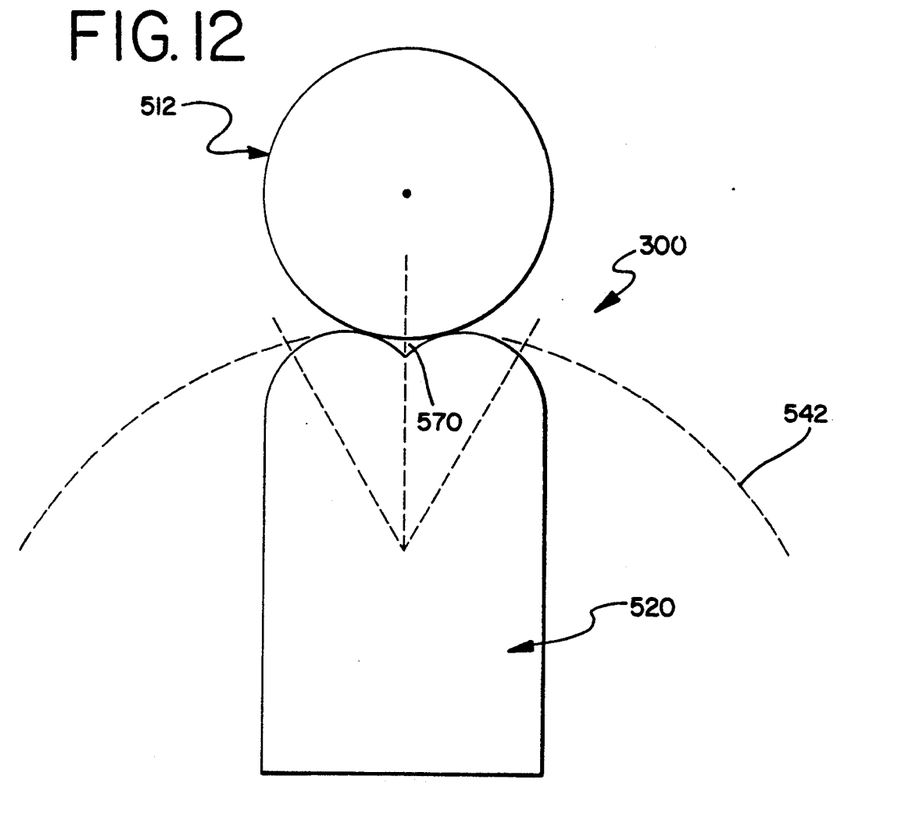
FIG. 12 is a schematic view of a second embodiment of the linkage block having a return to neutral notch; and, FIG. 13 is another embodiment of the force neutralizing mechanism.

FIG. 12 shows another embodiment of the linkage block 520 when the joystick is in the neutral position A. As discussed above, it is desirable to have a return to neutral mechanism 300 associated with the joystick 20. This may be accomplished by including a notch 570 in the head end 522 of the linkage block 520 so that the roller 512 homes in on this position which corresponds to the joystick being in the neutral position A.

Figure 13:
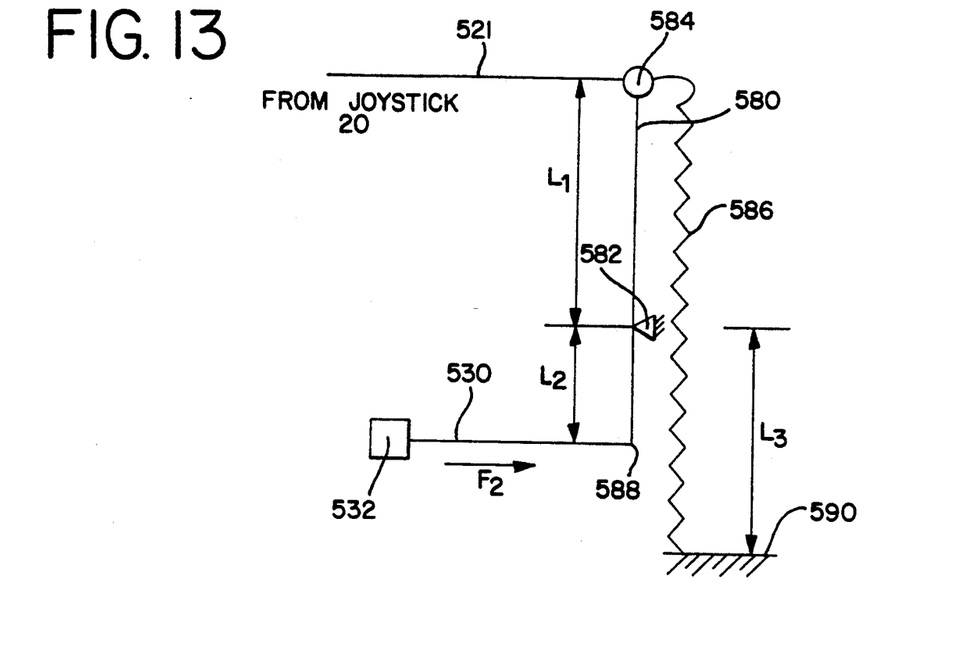

FIG. 13 shows another embodiment of the force neutralizing mechanism 500. A rigid rod 580 interconnects the joystick linkage 521 with the transmission control linkage 530. The rigid rod 580 is pivotally connected to the vehicle so that it pivots about point 582 at an intermediate portion of the rigid rod 580. As the joystick 20 is moved away from the neutral position, the joystick linkage point 584 moves to the left or right, and an extension spring 586 provides the necessary torque on the rigid rod 580 to overcome the transmission linkage force $F_2$. By varying the distance between the joystick linkage point 584 and the pivot point 582 designated by $l_1$, the distance from the pivot point to a transmission linkage point 588 designated by $l_2$, and the distance between the pivot point 582 and the point 590 where the extension spring 586 attaches to the vehicle, designated $l_3$, one can compensate for varying transmission linkage forces.

Figure 14:
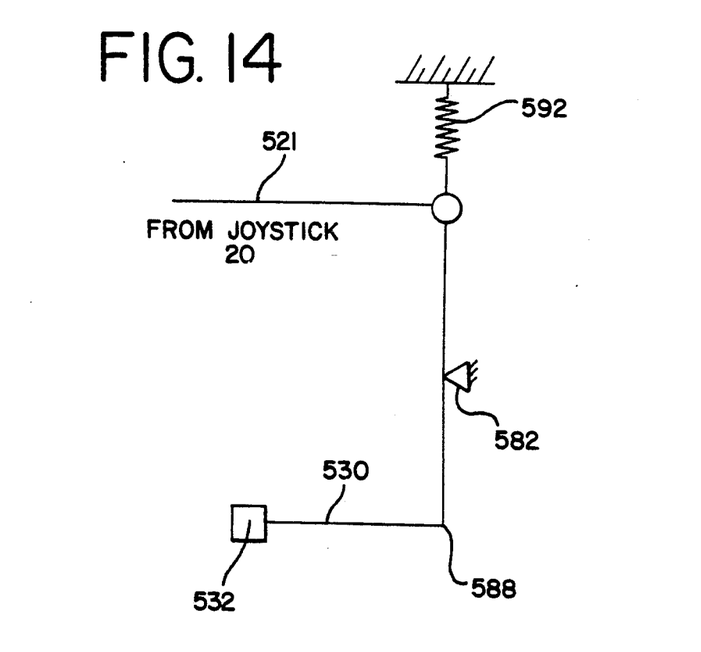
FIG. 14 is a further embodiment of the force neutralizing mechanism.

FIG. 14 shows a force neutralizing mechanism similar to that shown in FIG. 13 but instead of using an extension spring 586 it uses a compression spring 592.

While the specific embodiments have been illustrated and described, numerous modifications come to mind without significantly departing from the spirit of the invention and the scope of protection is only limited by the scope of the accompanying Claims.

We claim:

1. A safety device for a machine comprising:
 a single lever control pivotally mounted to a frame for controlling the operation of the machine, the control lever being movable from an operating position to a nonoperating position;
 means for preventing the pivotal movement of the lever when the lever is in the nonoperating position.

2. A safety device for a zero turning radius vehicle comprising:
 a single lever control pivotally mounted to a frame for controlling the speed and direction of the vehicle, the lever being movable from an operating position to a nonoperating position;
 means for preventing the pivotal movement of the lever when the lever is in the nonoperating position.

3. The device of claim 2 wherein the lever is pivotal about first and second transverse axes to control the speed and direction of the vehicle, and the lever is movable along a Z axis from an operating position to a nonoperating position, the Z axis is essentially perpendicular to the first and second axes.

4. The device of claim 3 wherein the means for preventing the pivotal movement of the lever when the lever is in the nonoperating position comprises:
 a channel, wherein a portion of the lever is moved into the channel when in the nonoperating position thereby preventing the pivotal movement of the lever.

5. A safety device for a vehicle having an ignition system comprising:
 a single lever pivotally mounted to a frame for controlling the speed and direction of the vehicle, the lever being movable from an operating position to a nonoperating position;
 means to disengage the ignition system of the vehicle when the lever is in the operating position.

6. The device of claim 5 wherein the lever is pivotable about a first and second transverse axes to control the speed and direction of the vehicle, and is movable along a Z axis from the operating position to the nonoperating position, the Z axis being essentially perpendicular to both the first and second axes.

7. The device of claim 6 wherein the means for disengaging the ignition system of the vehicle when the lever is in the operating position comprises:
 an electric switch having a first switch position to complete an ignition circuit of the ignition system and a second switch position to interrupt said ignition system, said switch having a portion responsive to said lever so that when said lever is in said nonoperating position said switch is in said first position and when said lever is in said operating position said switch is in said second position.

8. A device for controlling a zero turning radius vehicle having a right and left drive wheel and a mechanical transmission associated with each right and left drive wheel, the device comprising:
 a single lever being pivotally mounted to a frame, the single lever being movable from a first lever position to a second lever position;
 a linkage connecting the single lever to the transmissions, the linkage being moveable from a first linkage position to a second linkage position in response to movement of the lever from the first lever position to the second lever position;
 means for biasing the linkage toward the second linkage position when the lever is moved from the first lever position to the second lever position.

9. The device of claim 8 wherein the lever has two degrees of mechanical freedom being movable about a first and second transverse axes.

10. The device of claim 8 wherein the lever has three degrees of mechanical freedom being movable about a first and second transverse axes, and along a Z axis from an operating position to a nonoperating position, the Z axis is essentially perpendicular to the first and second axes.

11. The device of claim 8 wherein the means for biasing the linkage toward the second linkage position comprises:
a linkage block having first and second ends, the linkage block being mounted for pivotal movement about a pivot point intermediate the first and second pivot block ends, the linkage block being coupled to the linkage, the linkage being responsive to pivotal movement of the linkage block to assist movement of the linkage between the first and second linkage positions; and,
means for imparting a force upon the linkage block to rotate the linkage block about the pivot point.

12. The device of claim 11 wherein the means for imparting a force comprises a spring.

13. The device of claim 12 wherein the linkage block first end has a curved profile.

14. The device of claim 13 wherein the means for imparting a force further includes:
a housing defining an inner channel, the housing has first and second ends, the second end of the housing has an opening;
an endplate is attached to the first end of the housing to seal the first housing end;
a plunger having first and second ends is slidably mounted in the channel, the spring is mounted in the housing between the first housing end and the first plunger end, the plunger moves reciprocatingly within the channel in response to movement of the spring; and,
a roller is rotatably mounted on the second end of the plunger and cooperatively engages the first end of the linkage block through the housing opening thereby imparting a force necessary to overcome the transmission linkage force.

15. The device of claim 13 wherein the means for imparting a force further includes:
a pivot arm having first and second opposed ends, the pivot arm being mounted for pivotal movement at a point intermediate the first and second ends of the pivot arm, the spring is attached to the first end of the pivot arm; and,
a roller is rotatably mounted on the second end of the pivot arm and cooperatively engages the first end of the linkage block.

16. The device of claim 13 wherein the means for imparting a force further includes:
a pivot arm having first and second opposed ends, the first end is pivotally mounted to the vehicle, and the second end is attached to the spring; and, p1 a roller is rotatably attached to an intermediate portion of the pivot arm and cooperatively engages the first end of the linkage block.

17. The device of claim 8 wherein the means for biasing the linkage toward the second linkage position comprises:
a rigid rod having first and second ends, the rigid rod being pivotally connected to the vehicle at an intermediate portion of the rigid rod, the rigid rod being coupled to the linkage, the linkage being responsive to pivotal movement of the rigid rod to assist movement of the linkage between the first and second position; and,
means for imparting a force on the rigid rod to rotate the rigid rod about the rigid rod intermediate portion.

18. The device of claim 17 wherein the force is imparted on the first end of the rigid rod.

19. The device of claim 17 wherein the means for imparting a force is an extension spring.

20. The device of claim 17 wherein the means for imparting a force is a compression spring.

21. A device for neutralizing a transmission linkage force of a transmission so that the transmission may be comfortably controlled by a lever control, the lever being moveable between a first and second lever position, the device comprising:
a linkage block having first and second ends, the linkage block being mounted for pivotal movement about a pivot point intermediate the first and second pivot block ends;
a linkage adapted to couple the linkage block to both the lever and the transmission, the linkage being adapted to be moveable between a first and a second linkage position in response to movement of the lever from the first lever position to the second lever position;
means for imparting a force on the linkage block to rotate the linkage block thereby biasing the linkage toward the second position in response to movement of the lever from the first lever position to the second lever position.

22. The device of claim 21 wherein the means for imparting a force comprises a spring having a force.

23. The device of claim 22 wherein the linkage block first end has a curved profile.

24. The device of claim 23 wherein the means for imparting a force further includes:
a housing defining an inner channel, the housing has first and second ends, the second end of the housing has an opening;
an endplate is attached to the first end of the housing to seal the first housing end;
a plunger having first and second ends is slidably mounted in the channel, the spring is mounted in the housing between the first housing end and the first plunger end, the plunger moves reciprocatingly within the channel in response to movement of the spring; and,
a roller is rotatably mounted on the second end of the plunger and cooperatively engages the first end of the linkage block through the housing opening thereby imparting a force necessary to overcome the transmission linkage force.

25. The device of claim 24 wherein the housing further includes a set screw threaded through the housing endplate to engage the spring to change the force of the spring.

26. The device of claim 23 wherein the means for imparting a force further includes:
a pivot arm having first and second opposed ends, the pivot arm being mounted for pivotal movement at a point intermediate the first and second ends of the pivot arm, the spring is attached to the first end of the pivot arm; and,
a roller is rotatably mounted on the second end of the pivot arm and cooperatively engages the first end of the linkage block.

27. The device of claim 23 wherein the means for imparting a force further includes:
a pivot arm having first and second opposed ends, the first end is pivotally mounted to the vehicle, and the second end is attached to spring; and,
a roller is rotatably attached to an intermediate portion of the pivot arm and cooperatively engages the first end of the linkage block.

28. The device of claim 21 wherein the linkage block includes a mechanism which returns the control lever to a neutral position.

29. The device of claim 28 wherein the return to neutral mechanism is at the first end of the linkage block.

30. The device of claim 29 wherein the return to neutral mechanism comprises:
   a notch in the first end of the linkage block.

31. A safety device for a machine comprising:
   a single lever control having a shaft defining an axis, the lever being pivotally mounted to a frame for pivotal movement about two transverse axes for controlling the operation of the machine, the control lever being movable along the shaft to distinct positions including a neutral position, and a separate nonoperating position.

32. The device of claim 31 further includes:
   means for preventing the pivotal movement of the lever when the lever is in the nonoperating position.

* * * * *

UNITED STATES PATENT AND TRADEMARK OFFICE
CERTIFICATE OF CORRECTION

PATENT NO. : 5,279,376
DATED : January 18, 1994
INVENTOR(S) : Yang et al.

It is certified that error appears in the above-indentified patent and that said Letters Patent is hereby corrected as shown below:

At col. 6, line 21, "25" should be deleted.

At claim 1, col. 11, line 50, "pl" should be deleted.

Signed and Sealed this

Thirteenth Day of September, 1994

Attest:

BRUCE LEHMAN

Attesting Officer     *Commissioner of Patents and Trademarks*